United States Patent [19]

Bierlein

[11] 4,185,935
[45] Jan. 29, 1980

[54] COUPLING APPARATUS

[76] Inventor: John W. Bierlein, 9450 E. Townline Rd., Frankenmuth, Mich. 48734

[21] Appl. No.: 927,379

[22] Filed: Jul. 24, 1978

Related U.S. Application Data

[63] Continuation-in-part of Ser. No. 819,780, Aug. 25, 1977, abandoned.

[51] Int. Cl.² .............................................. F16B 17/00
[52] U.S. Cl. ...................................... 403/14; 403/324; 403/316
[58] Field of Search ............... 403/324, 325, 327, 355, 403/331, 13, 14, 316; 299/92

[56] References Cited

U.S. PATENT DOCUMENTS

| 670,790 | 3/1901 | Leffingwell | 403/355 |
|---|---|---|---|
| 693,595 | 2/1902 | Frazier | 403/331 X |
| 1,303,090 | 5/1919 | McCray | 403/331 X |
| 1,363,788 | 12/1920 | Hilton | 74/605 X |
| 1,408,993 | 3/1922 | Eberhardt | 403/355 |
| 2,893,298 | 7/1959 | Averette | 403/355 X |
| 3,045,785 | 7/1962 | Ferguson | 403/13 |
| 3,240,519 | 3/1966 | Weasler | 403/325 |
| 3,381,984 | 5/1968 | Sanders | 403/325 |

FOREIGN PATENT DOCUMENTS 547565  5/1977  U.S.S.R. .................................. 403/324

*Primary Examiner*—Andrew V. Kundrat

[57] ABSTRACT

Apparatus for detachably coupling two objects together including a pair of coupling blocks relatively movable between remote, inoperative positions, and adjacent, coupling positions. A locking tongue projects outwardly from one of the blocks and is received in a recess provided in the other of the blocks. A locking pin, mounted on the other of the blocks, is provided for movement thereon between a position in which the blocks may be moved toward and away from each other, and another position in which a portion of the locking pin bears against the tongue to urge the blocks toward each other.

10 Claims, 7 Drawing Figures

COUPLING APPARATUS

BACKGROUND OF THE INVENTION

This application is a continuation-in-part of application, Ser. No. 819,780, filed in the U.S. Patent Office on Aug. 25, 1977 and now abandoned.

This invention relates to apparatus for detachably coupling two objects together, and more particularly to a pair of coupling blocks including apparatus reacting therebetween for urging the coupling blocks into intimate engagement.

A conventional bolt and nut are frequently utilized to couple two articles together. For example, a farm cultivator is conventionally mounted on a tractor mounted cultivator frame via vertical bolts and rotary nuts. The installation of such nuts is time consuming and the nuts sometimes loosen, whereby the bolts and underlying cultivators rotate about the rotational axes of the bolts.

In an automobile assembly line operation, which would include the installation of passenger seats in an automobile, the passenger seats are frequently fastened to the automobile via bolts and nuts, whereby substantial time is required to tighten the various bolts and nuts, sometimes occasioning the use of relatively expensive machinery. It should be further pointed out that substantial time is often required to align holes, provided in the parts to be mated, so that the bolts can be inserted therethrough. The removal of such seats is delayed by the time required to remove the nuts and bolts.

Accordingly, it is an object of the present invention to provide new and novel apparatus for detachably coupling two articles together.

A further object of the present invention is to provide detachable coupling apparatus including alignment mechanism thereon for quickly and easily aligning the parts to be coupled.

Still another object of the present invention is to provide coupling apparatus which will require less time to couple parts together.

A further object of the present invention is to provide coupling apparatus for detachably coupling two articles together including a pair of coupling blocks and mechanism for detachably securing the blocks together and urging the blocks into intimate engagement.

Yet another object of the present invention is to provide apparatus for detachably coupling two objects together including a pair of coupling members including cooperating alignment projections and alignment recesses, one of the coupling members including a locking tongue thereon received in a recess provided in the other coupling member and a locking pin provided on the other coupling member reacting with the tongue for urging the coupling members toward each other.

A further object of the present invention is to provide coupling apparatus of the type described including a pair of coupling blocks including cooperating elongate alignment projections and recesses for aligning the parts, one of the blocks including a locking tongue projecting outwardly therefrom and received by an alignment recess provided in the other of the blocks, and a locking pin mounted on the other of the blocks for longitudinal movement between a first position in which the locking tongue can move into and out of the locking recess, and a second position in which a portion of the locking pin precludes separation of the blocks when the blocks are in adjacent coupling positions.

A still further object of the present invention is to provide coupling apparatus of the type described including a pair of coupling members, one of which includes a V-shaped, elongate, alignment block portion mounting a locking tongue thereon, the other of the blocks including a locking tongue recess receiving the locking tongue and an alignment recess, countersunk with the locking recess for receiving the alignment projection, and mechanism on the other of the blocks cooperating with the tongue for detachably holding the tongue in the recess.

Other objects and advantages of the present invention will become apparent to those of ordinary skill in the art as the description thereof proceeds.

SUMMARY OF THE INVENTION

Apparatus for detachably coupling two objects together comprising first and second coupling members, adapted to be coupled to the objects, relatively movable between remote positions and adjacent coupling positions; the first and second coupling members respectively including first and second opposed mating surfaces which are in abutting relation when the coupling members are in the adjacent coupling positions; the first coupling member having a locking tongue extending outwardly away from the first mating surface; the other coupling members having a locking recess in the second mating face for receiving the locking tongue; and mechanism, reacting between the other article and the locking tongue, and urging the mating faces toward each other, for detachably coupling the first and second coupling members together when the coupling members are in the adjacent coupling positions.

The present invention may more readily be understood by reference to the accompanying drawings in which.

DESCRIPTION OF THE PREFERRED EMBODIMENT

Figure 5:
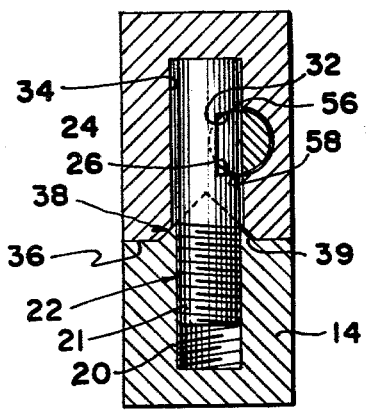
FIG. 5 is a sectional end view, taken along the line 5—5 of FIG. 1.

Apparatus constructed according to the present invention is generally designated 10 and includes a pair of coupling blocks, generally designated 12 and 14 respectively, mounted on articles to be coupled such as a tractor mounted cultivator frame F and a cultivator C. The blocks 12 and 14 may be suitably cast or milled from steel or suitable plastic material. The coupling block 14 includes a longitudinally extending V-block portion 16 which is V-shaped in cross section, as illustrated in FIG. 5. The V-block portion 16 includes a pair of outwardly converging, mating surfaces 18. An aperture 20 is tapped in the center of the V-block portion 16, and threadedly receives a threaded end 21 of an outwardly projecting locking tongue or projection, generally designated 22. The V-block portion 16 includes upwardly converging surfaces 18 terminating in an edge 28. The locking tongue or projection 22 includes a longitudinally extending, slot or notch 24 in the side thereof, having a lower sidewall 26 which is generally perpendicular to the edge 28 and the locking tongue axis 30 and an opposed, upper, beveled sidewall 32 which is inclined relative to the sidewall 26 for a purpose to become apparent hereinafter.

Figure 1:
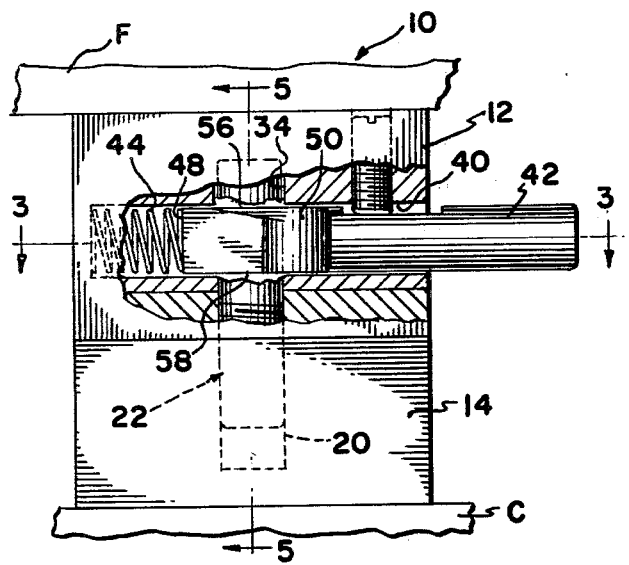
FIG. 1 is a side elevational view, partly broken away in section to more clearly illustrate the locking pin and locking tongue construction.
Figure 2:
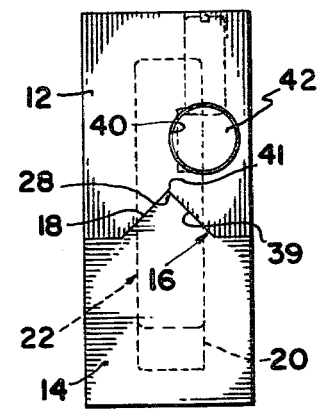
FIG. 2 is an end elevational view thereof.

The other mounting block 12 includes a locking bore or recess 34 for receiving the locking tongue 22. The block 12 includes a matching surface 36 which includes an elongate, longitudinally extending, V-shaped recess 38 which is complementally formed to the V-block portion 18 of block 14. The recess 38 includes upwardly converging surfaces 39 terminating in a root edge 41. The surfaces 18 of the V-block portion 16 guide along the inclined guide surfaces 39 of recess 38 to precisely align the blocks 12 and 14 when blocks 12 and 14 are moved between remote positions and the adjacent coupling positions illustrated in FIG. 5. The mating surfaces 39 and 18 are in abutting relation when the blocks 12 and 14 are in the adjacent coupling position, illustrated in FIGS. 1 and 2.

Figure 3:
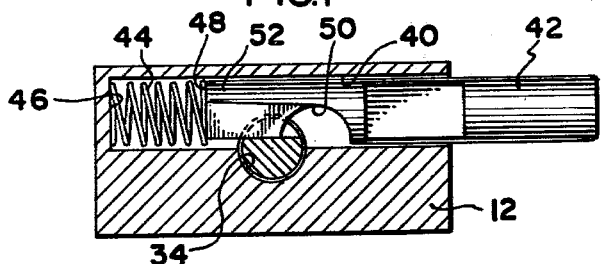
FIG. 3 is a top plan sectional view, taken along the line 3—3 of FIG. 1.
Figure 4:
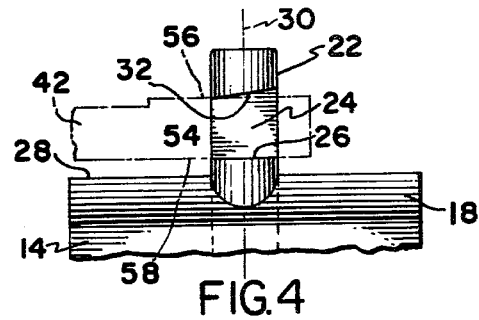
FIG. 4 is a side elevational view illustrating only a portion of one of the mounting blocks.

Apparatus is provided for selectively precluding separation of the blocks from the adjacent positions illustrated in FIG. 5 and includes a longitudinally extending, generally cylindrical bore 40 which intersects the locking tongue bore 34 and receives a longitudinally extending, locking pin, generally designated 42. A coil spring, generally designated 44, reacts between the inner end 46 of the bore 40 and the inner end 48 of the locking pin 42 to resiliently, yieldably urge the pin 42 to the locking position illustrated in FIG. 3, but permitting movement of the locking pin 42 to the unlocking position illustrated in FIG. 6.

Figure 6:
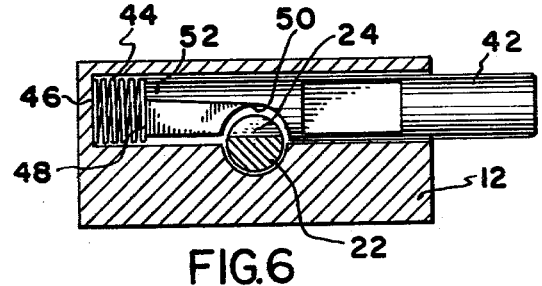
FIG. 6 is a top plan view, similar to FIG. 3, illustrating the parts in adjusted, locking positions.
Figure 7:
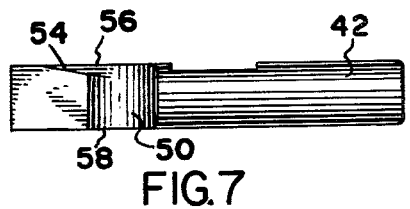
FIG. 7 is a sectional side elevational view, taken along the line 7—7 of FIG. 3.

The pin 42 includes a semi-cylindrical notch 50 in the sidewall thereof, which will receive the locking tongue 22 and permit the locking tongue 22 to freely move into and out of the locking recess 34 when the pin 42 is in the position illustrated in FIG. 6. The terminal end 52 of the pin 42 includes a generally rectangular block section or locking tab 54 which is received by the locking tongue slot 24 when the locking pin 42 is in the locking position illustrated in FIG. 3. The locking tab 54 includes upper and lower generally parallel surfaces 56 and 58 which oppose the sidewalls 26 and 32, respectively, of the locking tongue slot 24. As the pin 42 moves from the position illustrated in FIG. 6 to the locking position illustrated in FIG. 3, the upper side surface 56 will bear against the beveled surface 32 urging the mating faces 18 and 39 into intimate engagement. The surfaces 56 and 32 will thus wedge the blocks 12 and 14 together. When the locking pin 42 is in the position illustrated in FIG. 6, the pin 42 is released so that the blocks 12 and 14 can be easily separated. The parts 12 and 14 may be readily detached by merely depressing the pin 42 against the biasing force of spring 44 until the recess 50 is aligned with the pin 22 to permit separation of the blocks 12 and 14.

THE OPERATION

The blocks 12 and 14 may be initially welded or otherwise suitably secured to be coupled to such as a tractor frame F and a farm implement, such as a cultivator C. The blocks 12 and 14 are positioned such that the locking tongue 22 is aligned with the locking bore 34. The locking pin 42 on block 12 is depressed or moved inwardly to the position illustrated in FIG. 6 and the blocks 12 and 14 are moved together to the adjacent positions illustrated in FIGS. 1, 2, and 6, in which the locking tongue 22 is received in the locking bore 34 and the mating surfaces 19 and 39 are abutting. The converging surfaces 19 of V-block portion 18 will guide on the surfaces 39 of the V-slot 38 to automatically align the blocks 12 and 14 as the blocks 12 and 14 are moved to the coupling positions illustrated in FIGS. 2 and 5. The pin 42 is then released and the spring 44 will force the pin 42 from the retracted position illustrated in FIG. 6 to the extended, locking position illustrated in FIG. 3. As the locking pin 42 moves from the position illustrated in FIG. 6 to the position illustrated in FIG. 3, the upper wedging surface 56 provided on the locking pin 42 will bear against the beveled surface 32 to exert a force on the wedging surfaces 32, 56, tending to urge the blocks 12 and 14 toward each other into intimate engagement. The alignment projection 22 and the alignment recess 38 will preclude the block 14 and the cultivator mounted thereon from turning, about the axis 30. The locking tongue 22 will preclude separation of the blocks 12 and 14.

When it is desired to detach the blocks 12 and 14 and the articles mounted thereon, the pin 42 is merely depressed or retracted to the position illustrated in FIG. 6 against the force of the biasing spring 44. The blocks 12 and 14 can then be separated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Coupling apparatus comprising:
   a first longitudinally extending coupling member including a laterally outwardly opening, projection receiving, alignment recess having laterally inwardly converging sidewall surfaces;
   a second coupling member having a laterally outwardly extending alignment projection laterally movable into and out of said recess, said projection including laterally outwardly converging sidewall surfaces which are complemental to said inwardly projecting sidewall surfaces;
   said coupling members being relatively laterally movable between laterally spaced apart positions and adjacent coupling positions in which said outwardly converging sidewall surfaces abut said inwardly converging sidewall surfaces;
   one of said first and second coupling members including a laterally extending locking tongue projecting laterally outwardly away from one of said laterally inwardly converging wall surfaces and said laterally outwardly converging wall surfaces;
   the other of said first and second coupling members including a laterally extending locking recess on the other of said inwardly converging wall surfaces and said outwardly converging wall surfaces for laterally receiving said locking tongue means when said coupling members are in said coupling positions; and
   locking pin means, mounted on said other of said first and second coupling members for movement between a first position in which said locking tongue can laterally move into and out of said locking recess and a second position in which a portion of said locking pin means prevents lateral separation of said blocks when said blocks are in said adjacent coupling positions;

said portion of said locking pin means including means reacting with said locking tongue for laterally urging said blocks toward each other when said locking pin means is in said second position.

2. The apparatus set forth in claim 1 wherein said outwardly converging surfaces terminate at an apex, said second coupling member including said locking tongue which projects laterally outwardly from said apex, said locking recess being laterally countersunk in said first coupling member to provide said alignment recess for receiving said locking tongue.

3. The apparatus set forth in claim 1 wherein said urging means includes wedging means for laterally wedging said coupling members together.

4. The apparatus set forth in claim 1 wherein said locking tongue includes a first slot therein, said locking pin means, having a transverse slot therein, mounted on said other coupling member for movement between said first position in which said locking tongue can laterally move into and out of said locking recess and said transverse slot and said second position in which said portion of said locking pin means is received by said first slot to prevent spreading of said objects, said portion of said locking pin means and said first slot including cooperating beveled faces for urging said coupling members together.

5. The apparatus set forth in claim 4 wherein said portion of said locking pin means includes a locking tab received by said first slot, yieldable means yieldably inwardly urging said locking pin means to said first position but permitting said locking pin means to move outwardly to said second position, said cooperating beveled faces defining a wedge which laterally urges said locking projection into said locking recess.

6. The apparatus set forth in claim 4 wherein said alignment projection comprises an elongate block having a V-shaped cross-section defining said outwardly converging sidewalls; said alignment recess comprising a complemental, elongate V-shaped recess defining said internally converging sidewalls;

said locking pin means being disposed for longitudinal movement in said first slot to compress said yieldable means.

7. The apparatus set forth in claim 1 wherein said alignment recess comprises an elongate slot which is V-shaped in cross section; said alignment projection comprises a complementally shaped V-block portion.

8. Apparatus for detachably coupling two articles together comprising:

an elongate, V-shaped plug having laterally outwardly converging sidewalls coupled to one of said articles;

a complementally shaped, outwardly opening, alignment recess having laterally inwardly converging sidewalls, provided on the other of said articles for laterally receiving said V-shaped plug;

a laterally outwardly projecting locking tongue mounted on said outwardly converging sidewalls;

a locking recess provided in said inwardly converging sidewalls for laterally receiving said locking tongue; and means, reacting between said other article and said locking tongue, for laterally urging said articles toward each other.

9. Apparatus for detachably coupling two articles together comprising:

first and second coupling blocks, adapted to be coupled to said articles, relatively laterally movable toward and away from each other between remote positions and adjacent coupling positions;

said first block including a longitudinally extending alignment projection and said second block including a longitudinally extending alignment recess receiving said alignment projection;

one of said first and second blocks including a laterally extending locking tongue projecting outwardly away from one of said alignment projection and said alignment recess;

the other of said first and second blocks including a laterally extending locking recess aligned with the other of said alignment projection and said alignment recess for receiving said locking tongue;

said alignment projection including longitudinally extending, slot means therein; and locking pin means, mounted on said other of said blocks for longitudinal movement between a first position in which said locking tongue can laterally move into and out of said locking recess and a second position in which a portion of said locking pin is received by said slot means, for preventing lateral separation of said blocks when said blocks are in said adjacent coupling positions.

10. The apparatus set forth in claim 9 wherein means is provided for yieldably inwardly urging said locking pin means to said second position; said portion of said pin means and said tongue including cooperating wedge surfaces urging said blocks toward each other as said locking pin means moves to said second position.

* * * * *